(12) United States Patent
Thresher

(10) Patent No.: US 12,478,053 B1
(45) Date of Patent: Nov. 25, 2025

(54) FISH HOOKING DEVICE

(71) Applicant: Glenn Allen Thresher, Whitehall, MT (US)

(72) Inventor: Glenn Allen Thresher, Whitehall, MT (US)

( * ) Notice: Subject to any disclaimer, the term of this patent is extended or adjusted under 35 U.S.C. 154(b) by 0 days.

(21) Appl. No.: 18/814,237

(22) Filed: Aug. 23, 2024

(51) Int. Cl.
*A01K 97/11* (2006.01)

(52) U.S. Cl.
CPC ................... *A01K 97/11* (2013.01)

(58) Field of Classification Search
CPC ........................................ A01K 97/11
See application file for complete search history.

(56) References Cited

U.S. PATENT DOCUMENTS

| | | | | |
|---|---|---|---|---|
| 4,354,324 A * | 10/1982 | Eblen | ..................... | A01K 97/11 43/15 |
| 6,751,900 B1 * | 6/2004 | Paulson | ................. | A01K 97/01 43/15 |
| 8,567,108 B1 * | 10/2013 | Babbs | ..................... | A01K 97/11 43/21.2 |
| 2008/0134563 A1 * | 6/2008 | Gunter | ................... | A01K 97/11 43/16 |
| 2009/0094878 A1 * | 4/2009 | Dungan | ............... | A01K 91/065 43/19.2 |

* cited by examiner

*Primary Examiner* — Richard G Davis
(74) *Attorney, Agent, or Firm* — Plager Schack LLP; Mark H. Plager; Kara K. Verryt

(57) ABSTRACT

An automatic fish hooking device for hooking a fish without user intervention may include an elongate frame; a first trigger extending from and pivotably attached to the first end of the elongate frame, the first trigger configured to support a fishing line extending from a fishing rod; a second trigger pivotably mounted to the elongate frame proximate to the first trigger, wherein the second trigger is configured to removably engage with the first trigger and with the fishing line; a fishing pole holder adjustably attached to the second end of the elongate frame, the fishing pole holder configured to securely hold the fishing rod; and a pair of stabilizing arms adjustably extending outward from the elongate frame, the pair of stabilizing arms each having a distal end configured to stabilize the elongate frame during use.

10 Claims, 4 Drawing Sheets

FISH HOOKING DEVICE

BACKGROUND

The embodiments described herein relate generally to fishing accessories and tools and, more particularly, to a fish hooking device that automatically trips and hooks a fish for a fisherman.

Frequently, fishermen will secure fishing poles in pole holders while fishing. However, when a fish bites a baited hook and a fisherman is not at the pole to hook the fish, the fisherman tends to lose both the bait and the fish. While automatic fish hooking devices do exist, the existing devices are bulky and difficult to use when ice fishing in cold weather, as they include smaller pins that are difficult to manipulate with cold hands or gloves.

Therefore, what is needed is a compact automatic fish hooking device that is easier and faster to set up, wherein the fish hooking device does not include any pins that must be pulled or reattached to function.

SUMMARY

Some embodiments of the present disclosure include an automatic fish hooking device for hooking a fish without user intervention. The device may include an elongate frame; a first trigger extending from and pivotably attached to the first end of the elongate frame, the first trigger configured to support a fishing line extending from a fishing rod; a second trigger pivotably mounted to the elongate frame proximate to the first trigger, wherein the second trigger is configured to removably engage with the first trigger and with the fishing line; a fishing pole holder adjustably attached to the second end of the elongate frame, the fishing pole holder configured to securely hold the fishing rod; and a pair of stabilizing arms adjustably extending outward from the elongate frame, the pair of stabilizing arms each having a distal end configured to stabilize the elongate frame during use.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
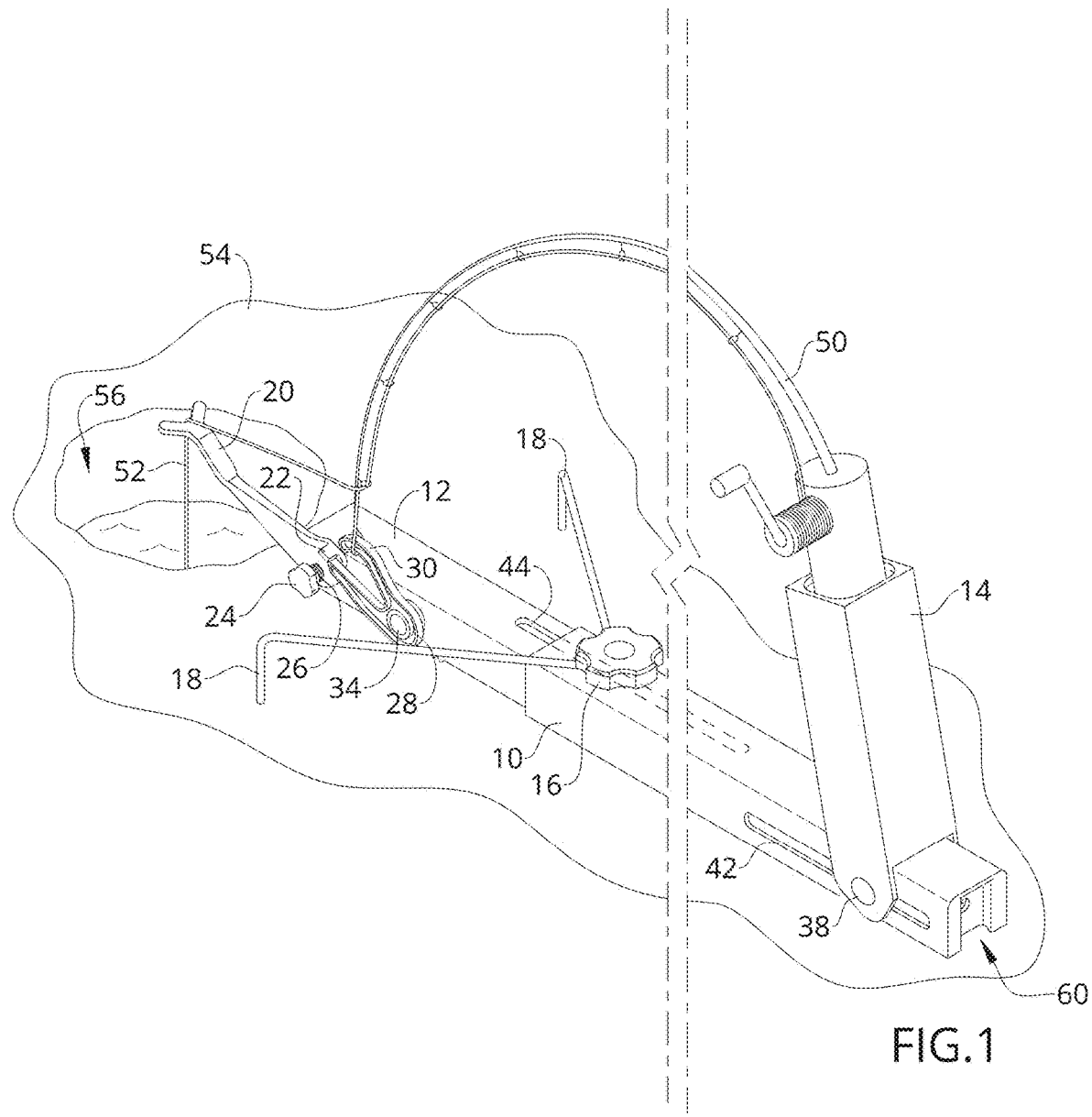
FIG. 1 is a perspective view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as an automatic fish hooking device and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-4, some embodiments of the present disclosure include an automatic fish hooking device for hooking a fish without user intervention, the automatic fish hooking device comprising an elongate frame having a first end and a second end; a first trigger 20 extending from and pivotably attached to the first end of the elongate frame, the first trigger configured to support a fishing line 52 extending from a fishing rod 50; a second trigger 28 pivotably mounted to the elongate frame proximate to the first trigger 20, wherein the second trigger 28 is configured to removably engage with the first trigger 20 and with the fishing line 52, such that when the first trigger 20 pivots downward, the second trigger 28 is disengaged from the first trigger 20 and releases the fishing line 52; a fishing pole holder 14 adjustably attached to the second end of the elongate frame, the fishing pole holder 14 configured to securely hold the fishing rod 50; and a pair of stabilizing arms 18 adjustably extending outward from the elongate frame, the pair of stabilizing arms 18 each comprising a distal end configured to stabilize the elongate frame to prevent or reduce the likelihood of the device tipping over during use.

Figure 2:
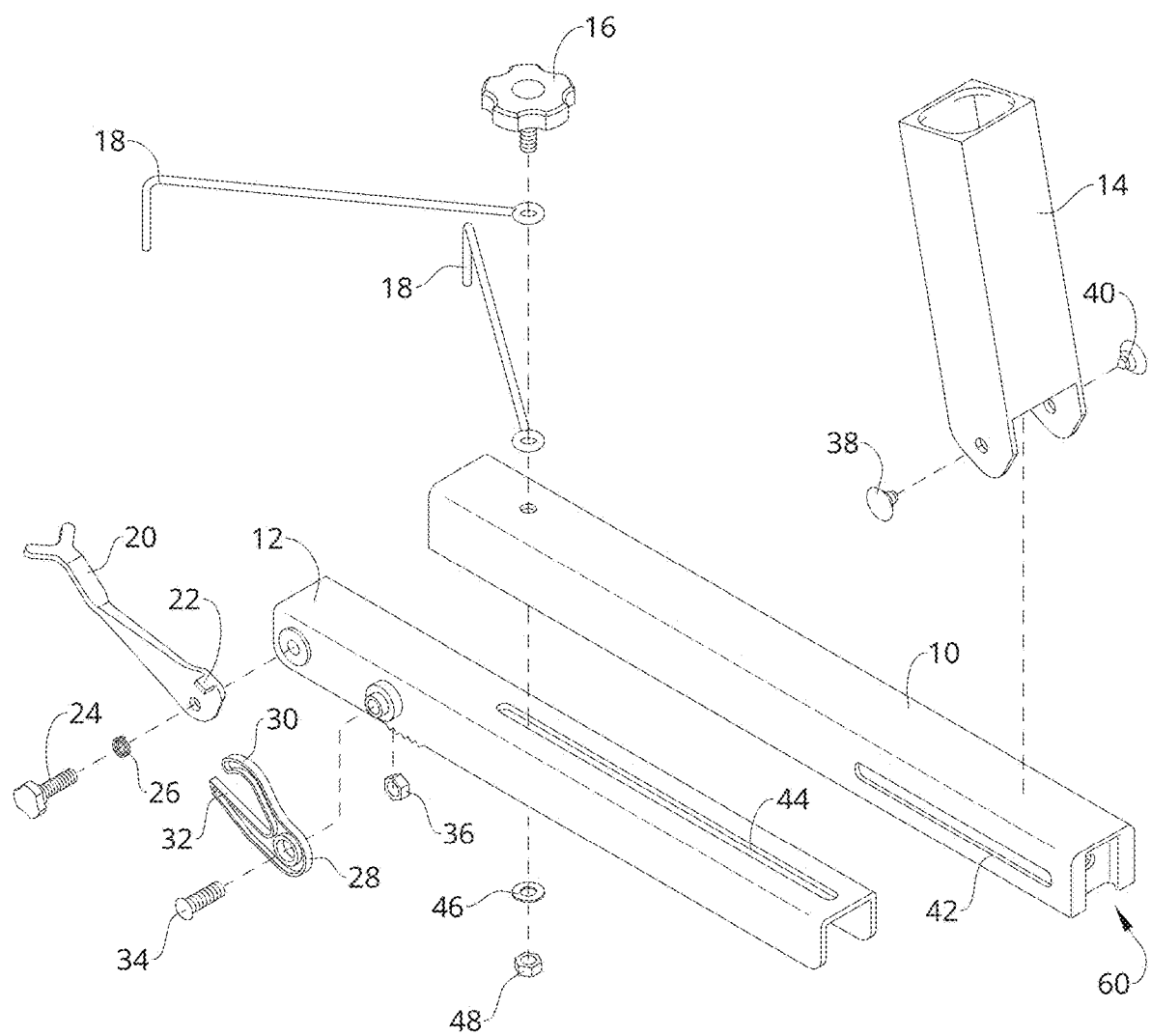
FIG. 2 is an exploded view of one embodiment of the present disclosure.
Figure 3:
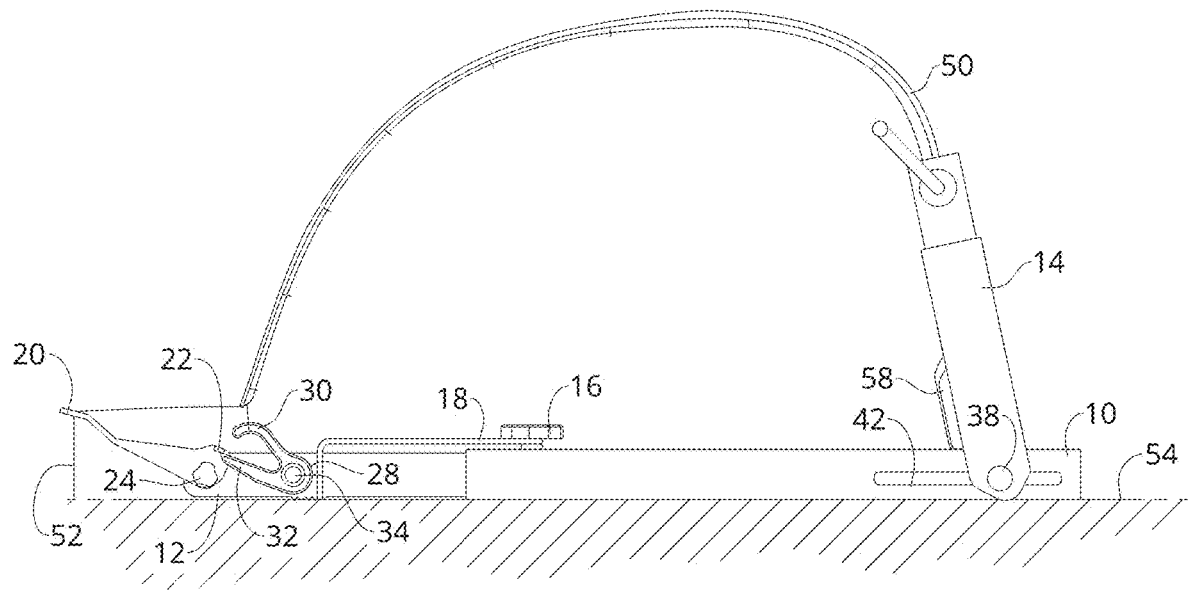
FIG. 3 is a side view of one embodiment of the present disclosure, shown in use.
Figure 4:
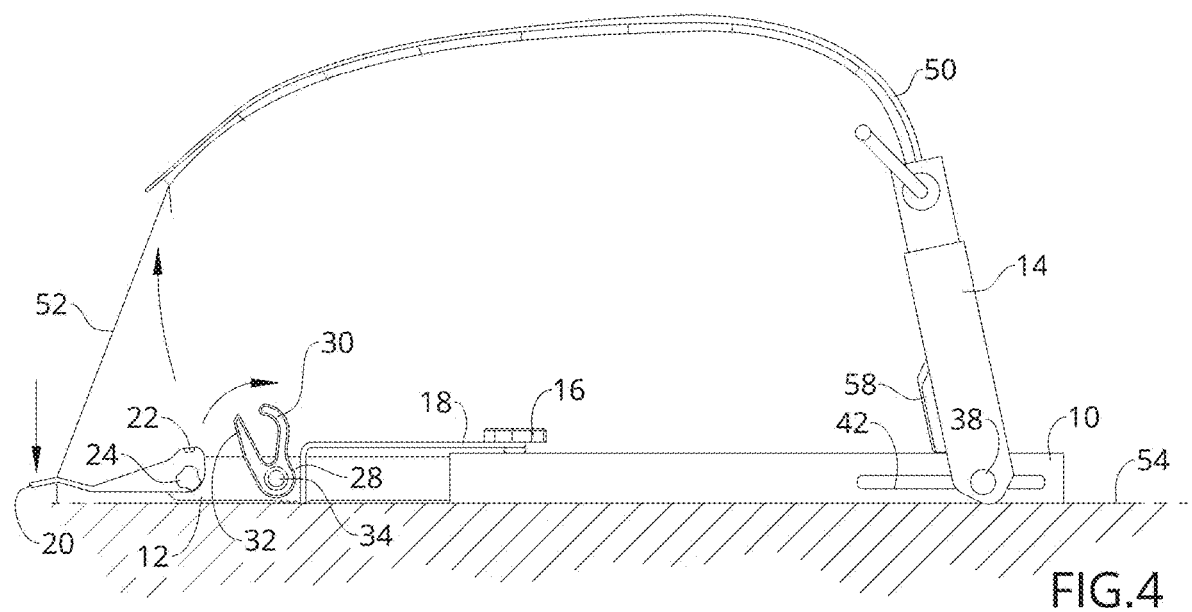
FIG. 4 is a side view of one embodiment of the present disclosure, showing motion during use.

More specifically, and as shown in the Figures, the elongate frame may comprise an expandable frame comprising an outer frame 10 and an inner frame 12 telescopically engaged with the outer frame 10. Each of the outer frame 10 and the inner frame 12 may be made of square tubing or squared-off U-shaped tubing. As such, the outer frame 10 may have a pair of side surfaces and a top surface extending between the top edges of the side surfaces. As shown in FIG. 2, the side surfaces of the outer frame 10 proximate to the second end thereof may include an outer frame elongate slot 42 extending therethrough. The fishing pole holder 14 may be adjustably engaged with the outer frame elongate slot 42 via a pair of holder fasteners 38, 40. More specifically, as shown, the fishing pole holder 14 may comprise a substantially hollow tube with an inner opening sized to accommodate insertion of the fishing rod handle therein. A second end of the fishing pole holder 14 may comprise a pair of parallel tabs extending outward therefrom, wherein the outer frame 10 may fit between the parallel tabs, such that the fishing pole holder 14 may slide along a length of the outer frame 10. Each of the parallel tabs may have a fastener orifice extending therethrough, wherein the fastener orifices are sized to accommodate insertion of the holder fasteners 38, 40 therein. As such, the fishing pole holder 14 may be placed onto the outer frame 10 and secured by passing the respective holder fastener 38, 40 through the respective fastener orifices and outer frame elongate slots 42. The fishing pole holder 14 may be slid along the outer frame elongate slot 42 to the desired position and secured by holder fasteners 38, 40. In some embodiments, and as shown in the Figures, the holder fasteners 38, 40 may each be a lock rivet, such as a nylon lock rivet. As also shown in the Figures, some embodiments of the fishing pole holder 14 may comprise at least one, such as a plurality of, stops 58 protruding from a top surface thereof, wherein the top surface is defined as the surface that is aligned with the top surface of the elongate frame when the device is in its folded configuration, as explained in more detail below. As shown in FIGS. 3 and 4, the stops 58 may extend outwards to prevent full pivoting of the fishing pole holder 14 toward the first end of the elongate frame. As such, these stops 58 function to keep the fishing pole holder 14 in an upright position during use of the device of the present disclosure.

In some embodiments, the outer frame 10 may further comprise a connection structure on the second end thereof. More specifically, the connection structure may be a female dovetail slot 60. The female dovetail slot 60 may be structured, both in size and shape, to receive an optional separate electronic device that causes movement of the device to drive the bait or lure up and down.

As also shown in FIG. 2, the inner frame 12 may have a squared off U-shape and may, thus, comprise a pair of inner frame side surfaces and an inner frame top surface extending between upper edges of the inner frame side surfaces. A second end of the inner frame 12 may be defined as that which slides into the outer frame 10. As shown in FIG. 2, an inner frame elongate slot 42 may extend through the inner frame top surface, starting proximate to the second end of the inner frame and extending toward the first end thereof. The outer frame 10 may include a fastener orifice extending through the top surface thereof, proximate to the first end thereof, wherein the fastener orifice is configured to align with the inner frame elongate slot 44 when the inner frame 12 is slid into the outer frame 10. A top knob 16 with a threaded post extending downward therefrom may pass through each of the fastener orifice and the inner frame elongate slot 44 to secure the inner frame 12 to the outer frame 10. A nut 48 and washer 46 may engage with a distal end of the threaded post to prevent unintentionally disengagement of the inner frame 12 from the outer frame 10. To allow for adjustability of the inner frame 12 with respect to the outer frame 10, the top knob 16 may be loosened, allowing the inner frame 12 to slide with respect to the outer frame 10. To secure the inner frame 12 at its desired position, the top knob 16 may simply be tightened.

As shown in the Figures, the pair of stabilizing arms 18 may each comprise an elongate arm with a hooked distal end, wherein the distal end comprises a bend, such as an about 90-degree bend, and a proximal end comprising a ring, wherein the ring is sized to accommodate insertion of the threaded post of the top knob 16 therethrough. Thus, the stabilizing arms 18 may each be adjustably engaged with the outer frame 10, wherein loosening the top knob 16 allows for pivoting of the stabilizing arms 18 with respect to the outer frame 10.

As mentioned above, a first trigger 20 and a second trigger 28 may each be pivotably attached to an outer surface of the inner frame 12, wherein the first trigger 20 may be configured to support and guide a fishing line 52 extending from a fishing rod 50, and the second trigger 28 may be configured to removably engage with both the first trigger 20 and the fishing line 52. More specifically, and as shown in FIG. 2, the first trigger 20 may be pivotably engaged with a side surface of the inner frame 12 proximate to the distal end thereof. The first trigger 20 may comprise a trigger body with a forked first end and a planar second end, the planar second end having a fastener orifice extending therethrough and a trigger tab 22 extending substantially perpendicularly outward from the planar second end thereof. A first trigger fastener 24, such as a bolt, may be used to pivotably attach the first trigger 20 to the inner frame 12, wherein a spring 26 may be engaged with the first trigger fastener 24 and the first trigger 20, to create a setting tension. The setting tension may be such that the first trigger 28 drives downward with respect to the elongate plane of the frame when the spring 26 is relaxed. The second trigger 28 may be pivotably attached to the side surface of the inner frame 12 proximate to the first trigger 20, such that an arm on the second trigger 28 is configured to removably engage with the first trigger tab 22. More specifically the second trigger 28 may a claw-like shape with a hub, an upper arm 30 extending from the hub and a lower arm 32 extending from the hub in the same direction as the upper arm 30, but spaced apart from the upper arm 30. A distal end of the lower arm 32 may be positioned to removably engage with the first trigger tab 22, and the distal end of the upper arm 30 may be slightly curved to function as a catch for the fishing line 52 during use. As shown in FIG. 2, the hub of the second trigger 28 may have a fastener orifice extending therethrough, wherein the second trigger 28 may be pivotably engaged with the frame via a second trigger fastener 34 extending through the hub and the frame, engaging with a second trigger nut 36.

Figure 5:
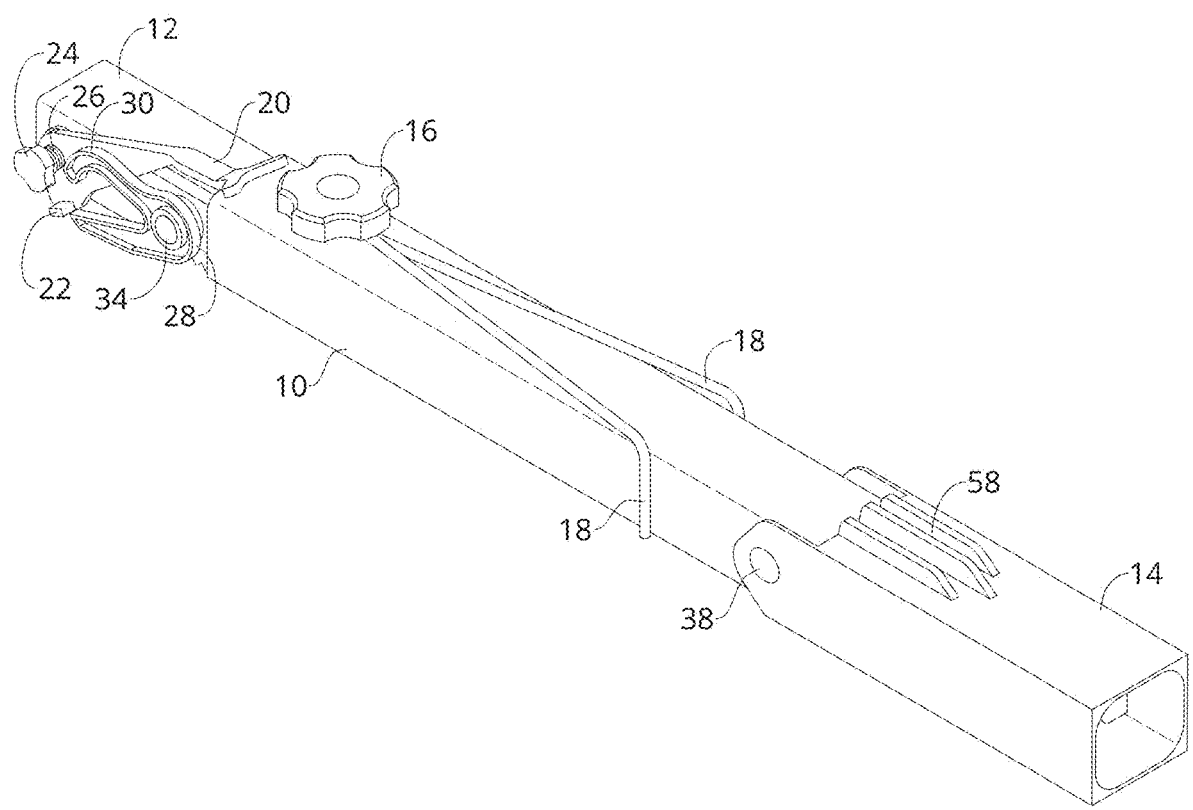
FIG. 5 is a perspective view of one embodiment of the present disclosure, shown in a folded configuration.

As shown in FIG. 5, the device of the present disclosure may fold for transport or storage. Specifically, the first trigger 20 may be rotated backwards to be positioned against the elongate frame. The stabilizing arms 18 may also be pivoted inwards to be positioned adjacent to the elongate frame. Lastly, the fishing pole holder 14 may be pivoted to be in line with and secured on the second end of the elongate frame.

The device of the present disclosure may be made from any desired materials and, in some embodiments, may be made from a combination of plastic and stainless steel. However, the use of other materials is envisioned. The dimensions of the components may vary depending on desired usage and personal preference.

To used the device of the present disclosure, the device may be placed on a surface, such as on ice 54 proximate to a fishing hole 56. The device may be positioned such that the frame extends outward from the fishing hole 56 with the forked end of the first trigger 20 positioned over the water. The stabilizer arms 18 may be pivoted outward and the top knob 16 may be tightened to secure the stabilizer arms 18 in place. A fishing rod 50 may be secured to the device by inserting the handle portion of the rod 50 into the fishing pole holder 14, wherein the holder 14 may be adjusted along a length of the outer frame 10, as needed. The second trigger 28 may then be pivoted upwards such that the bottom of the lower arm 32 is resting on top of the first trigger tab 22, and the fishing line 52 may be looped around the upper arm 30 of the second trigger 28 and then extending through the forked end of the first trigger 20. When a fish bites the bait or hook on the end of the fishing line 52, the fishing line 52 is pulled downward, releasing itself from the upper arm 30 of the second trigger 28, which in turn disengages the lower arm 32 from the tab 22, allowing the first trigger 20 and the fishing line 52 to move downward toward the water, hooking the fish.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. An automatic fish hooking device for hooking a fish without user intervention, the automatic fish hooking device comprising:
    an elongate frame having a first end and a second end;
    a first trigger extending from and pivotably attached to the first end of the elongate frame, the first trigger configured to support a fishing line extending from a fishing rod;
    a second trigger pivotably mounted to the elongate frame proximate to the first trigger, wherein the second trigger is configured to removably engage with the first trigger and with the fishing line;
    a fishing pole holder adjustably attached to the second end of the elongate frame, the fishing pole holder configured to securely hold the fishing rod; and
    a pair of stabilizing arms adjustably extending outward from the elongate frame, the pair of stabilizing arms each comprising a distal end configured to stabilize the elongate frame during use.

2. The automatic fish hooking device of claim 1, wherein the elongate frame has an adjustable length.

3. The automatic fish hooking device of claim 1, wherein:
    the elongate frame comprises an inner frame telescopically engaged with an outer frame;
    the first trigger and the second trigger are each pivotably engage with the inner frame; and
    the fishing pole holder is adjustably engaged with the outer frame.

4. The automatic fish hooking device of claim 3, wherein:
    the outer frame has a top surface and two side surfaces;
    the two side surfaces each include an outer frame elongate slot extending therethrough; and
    the fishing pole holder is adjustably engaged with the outer frame elongate slot.

5. The automatic fish hooking device of claim 4, wherein:
    the fishing pole holder comprises a hollow tube with an inner opening sized to accommodate insertion of the fishing rod handle therein;
    a second end of the fishing pole holder comprises a pair of parallel tabs extending outward therefrom; and
    the outer frame fits between the pair of parallel tabs, such that the fishing pole holder is configured to slide along a length of the outer frame.

6. The automatic fish hooking device of claim 3, wherein:
    the inner frame comprises an inner frame top surface and a pair of parallel side surfaces;
    an inner frame elongate slot extends through the inner frame top surface, starting proximate to a second end of the inner frame and extending toward a first end thereof;
    the outer frame comprises a top surface with a fastener orifice extending therethrough proximate to a first end thereof, wherein the fastener orifice is configured to align with the inner frame elongate slot when the inner frame is slid into the outer frame;
    a top knob with a threaded post extending downward therefrom is configured to pass through each of the fastener orifice and the inner frame elongate slot to secure the inner frame to the outer frame.

7. The automatic fish hooking device of claim 6, wherein:
    the first trigger is pivotably engaged with a side surface of the pair of parallel side surfaces of the inner frame proximate to the second end thereof;
    the first trigger comprises a trigger body with a forked first end and a planar second end, the planar second end having a fastener orifice extending therethrough and a trigger tab extending substantially perpendicularly outward from the planar second end thereof; and
    a first trigger fastener pivotably attaches the first trigger to the inner frame.

8. The automatic fish hooking device of claim 7, wherein the first trigger is spring loaded.

9. The automatic fish hooking device of claim 1, wherein the second trigger is pivotably attached to the side surface of the inner frame proximate to the first trigger, such that an arm on the second trigger is configured to removably engage with the first trigger tab.

10. The automatic fish hooking device of claim 9, wherein:
    the second trigger comprises a hub, an upper arm extending from the hub, and a lower arm extending from the hub spaced apart from the upper arm;
    a distal end of the lower arm is positioned to removably engage with the first trigger tab; and
    a distal end of the upper arm is curved to function as a catch for the fishing line during use.

* * * * *